United States Patent [19]

Maldonado

[11] 3,740,734

[45] June 19, 1973

[54] COARSE GRAIN POLYCRYSTALLINE FERROELECTRIC CERAMIC OPTICAL MEMORY SYSTEM

[75] Inventor: Juan Ramon Maldonado, Berkeley Heights, N.J.

[73] Assignee: Bell Telephone Laboratories, Incorporated, Murray Hill, N.J.

[22] Filed: Mar. 15, 1972

[21] Appl. No.: 234,965

[52] U.S. Cl.340/173 LM, 340/173 LM, 340/173.2, 350/160 R

[51] Int. Cl. .......... G11c 13/04

[58] Field of Search .......... 340/173 LS, 173.2, 340/173 LM; 350/160 R

[56] References Cited

UNITED STATES PATENTS

| | | | |
|---|---|---|---|
| 3,518,634 | 6/1970 | Ballman | 350/160 R |
| 3,530,441 | 9/1970 | Oushinsky | 340/173 |
| 3,576,546 | 4/1971 | Heyman | 340/173 |
| 3,672,746 | 6/1972 | Miller | 350/160 R |

*Primary Examiner*—Terrell W. Fears
*Attorney*—R. J. Guenther and Arthur J. Torsiglieri

[57] ABSTRACT

A coarse grain ferroelectric ceramic sandwiched Hbetween a pair of transparent electrodes and a photoconductive layer is used as a memory element. Write-in of information to be stored in selected portions of the plate (initially everywhere preset in a thermally depolarized state) is achieved by applying a sequence of two suitable voltage pulses of opposite polarity to the pair of electrodes. Advantageously, this voltage pulse sequence is applied in the presence of selectively scanning optical radiation incident on the photoconductive layer at locations corresponding to the selected portions of the plate, whereby the internal electrical polarization and hence optical scattering property (forward transmissivity) of the plate is modified selectively at those portions. Readout of the resulting pattern of information (internal polarizatio pattern) is performed simply by flooding the plate with visible light and viewing the image intensity pattern of the visible light transmitted by the plate. Erasure of all the information in the plate is accomplished by applying a suitable voltage across the extremities of one (or both) of the electrodes, in order to heat the whole plate to a suitable depolarization temperature.

10 Claims, 4 Drawing Figures

PATENTED JUN 19 1973 3,740,734
SHEET 2 OF 2
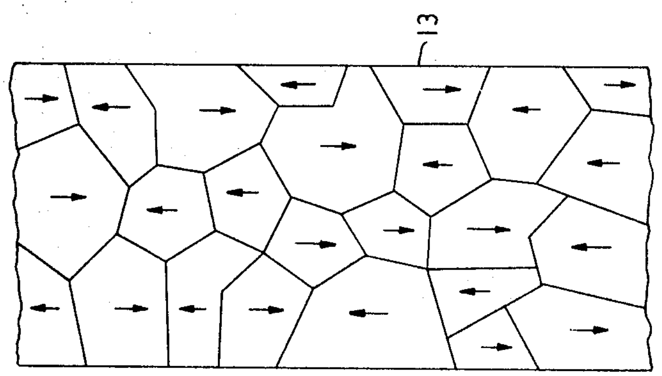
FIG. 2.3
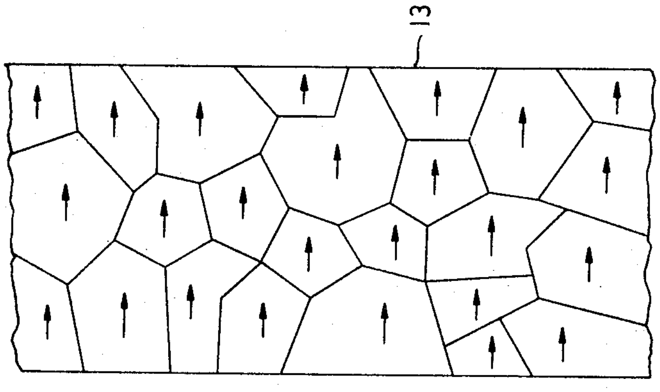
FIG. 2.2
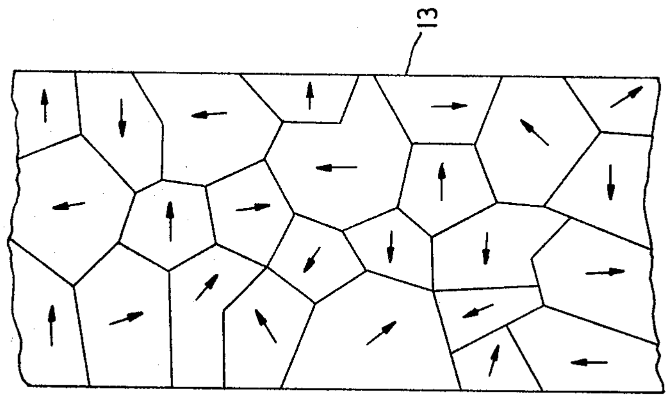
FIG. 2.1

COARSE GRAIN POLYCRYSTALLINE FERROELECTRIC CERAMIC OPTICAL MEMORY SYSTEM

FIELD OF THE INVENTION

This invention relates to the field of optical memory systems, in particular to those utilizing ferroelectric memory devices.

BACKGROUND OF THE INVENTION

In the prior art, such as U. S. Pat. Nos. 3,512,864 and 3,531,182, optical image storage and display devices have been described. These devices utilize the localized switching of the electrical polarization in a fine grain (2 micron or less grain size) polycrystalline electrooptic ferroelectric plate. This polarization switching results in a corresponding controllable modulation of the optical phase retardation property of the plate, which can be converted into a corresponding intensity pattern of the cross section of a readout optical beam simply by locating the plate between an optical polarizer and an analyzer in the presence of the readout optical beam. However, such devices require a somewhat complicated electrode configuration on the surface of the plate, due to the requirement of producing localized in-plane electric fields in the plate. Moreover, the polarizers and analyzers required for converting the controllable phase to intensity modulation (information) produce undesirable optical "insertion" losses.

On the other hand, *coarse* grain ferroelectric ceramics (crystal size above 4 micron) are also known to be sensitive to applied electric fields. In particular, the scattering of an incident optical beam traversing such ceramics is affected by the state of internal electrical polarization of the coarse grain material. Hence, the magnitude of the transmitted intensity (in the forward direction) of a readout optical beam is directly affected by the electrical field applied to the plate, without the need for optical polarizer or analyzer. However, until now the optical contrast ratio, that is, the ratio of maximum to minimum transmission, has been limited to 10 d.b.; and it would be desirable to improve upon this contrast ratio, for easier viewing of the optical patterns. Such an improvement is particularly desirable for such applications as slow scan graphics (optical "blackboard" writing), that is, for systems in which a continually changeable optical pattern of information is displayed on a viewing screen.

SUMMARY OF THE INVENTION

Higher optical contrast ratios than previously obtainable in a coarse grain ferroelectric electrooptic ceramic plate are obtained, according to this invention, by utilizing the optical scattering properties of a novel combination of two states (conditions) of internal electrical polarization, and by controllably switching the ceramic between these two states, by means of a suitable sequence of applied voltage pulses and thermal heating. In this way, optical contrast ratios utilizing the optical scattering property of the ceramic have been obtained, which are as high as 20 d.b.

In a specific embodiment of the invention, a coarse grain lanthanum doped lead zirconate-lead titanate ferroelectric plate, with a photoconductive film predeposited on one side thereof, is sandwiched between a pair of transparent electrodes. Each electrode is advantageously electrically connected to a terminal of a voltage pulse source which supplies pulses of opposite polarity across the electrodes. A laser beam selectively scans portions of the photoconductive film, in order that only the corresponding selected portions of the ceramic plate, initially in a thermally depolarized state, are subjected to significant electric fields produced by the voltage pulse. Thereby only these selected portions of the ceramic plate have their internal polarization switched by the voltage pulses. Thus, the plate is impressed with a desired pattern of internal polarizations corresponding to a desired pattern of regions of maximum and minimum scattering (minimum and maximum forward transmission, respectively). In turn, this pattern can be projected on to a viewing screen by directing a readout beam of visible light through the plate still sandwiched between the transparent electrodes and the transparent photoconductor layer. Thereby, a complete optically addressed and optically readout scan graphic system is provided, which can be completely erased at will by thermal heating means, and a new pattern can then be written in and displayed.

BRIEF DESCRIPTION OF DRAWING

This invention together with its objects, features, and advantages may be better understood from the following detailed description when read in conjunction with the drawing in which.

DETAILED DESCRIPTION OF THE EMBODIMENT

Figure 1:
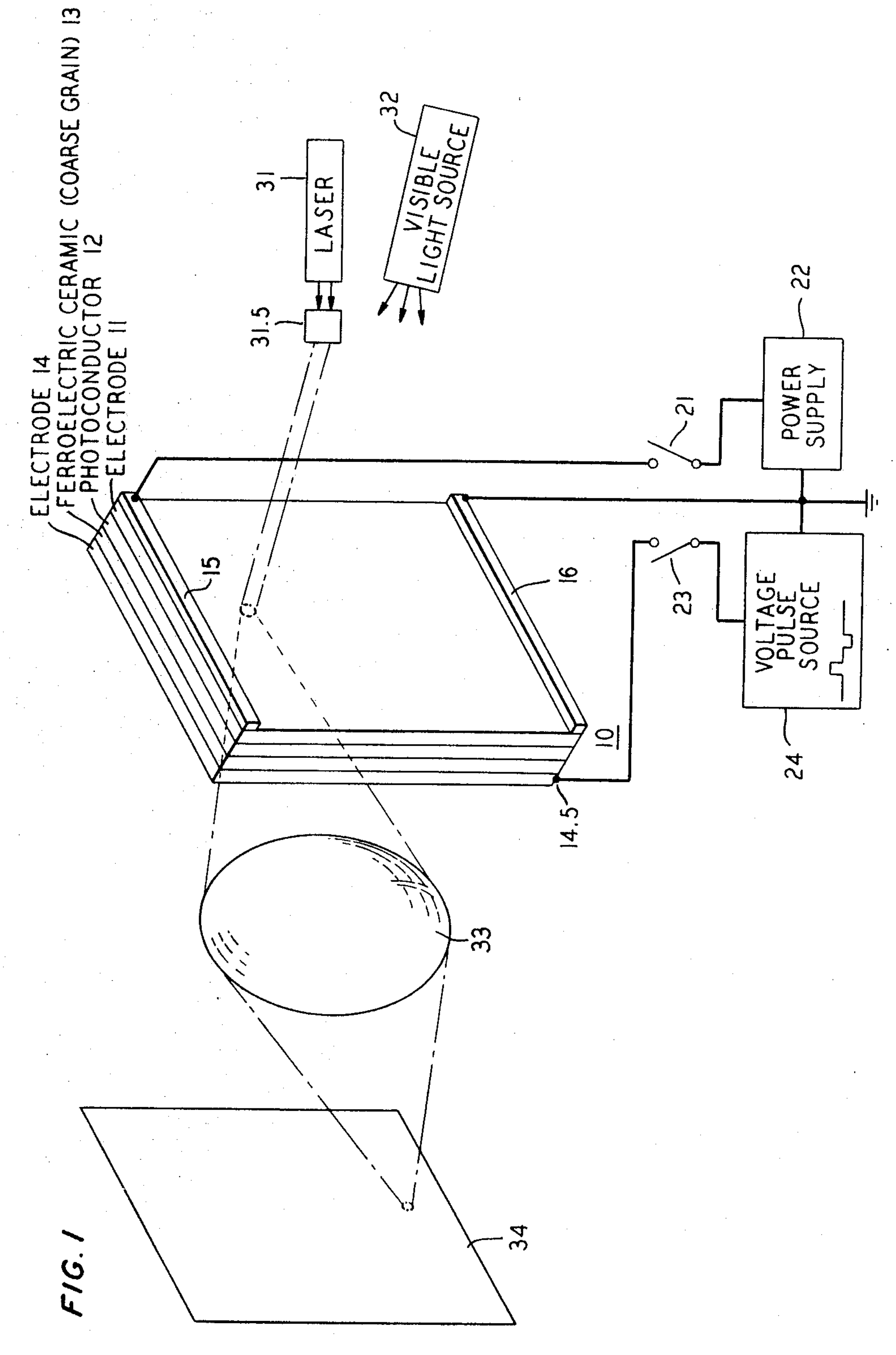
FIG. 1 is a diagram of an optical memory system in accordance with a specific embodiment of the invention, and FIGS. 2.1 through 2.3 are illustrations useful in understanding the operation of the system shown in FIG. 1. For the sake of clarity only, the drawings are not to scale.

A coarse grain ferroelectric ceramic plate 13 (FIG. 1) is located between a photoconductive layer 12 and a pair of transparent electrode layers 11 and 14. The electrode layer 14 is provided with a contact terminal 14.5 for external electrical connection. At the top and bottom edges of the exposed surface of the electrode layer 11 are located metallic strip contacts 15 and 16, respectively, in direct physical and electrical contact with the electrode layer 11. These contacts 15 and 16, together with the transparent electrode layers 11 and 14, the phtoconductive layer 12 and the plate 13 form an optical memory device 10. The contact 15 is connected to an electrical switch 21 for connection to a power supply 22, whereas the contact 16 is grounded. The electrode layer 14 is connected by way of the contact 14.5 to an electrical switch 23 for connection to a voltage pulse source 24. A laser source 31 provides a beam of light incident upon an optical deflection means 31.5, to provide a scanning laser beam which is controllably incident at any moment of time upon a selected portion of the photoconductive layer 12 through the transparent electrode layer 11. A source of visible readout light 32, such as a tungsten or mercury lamp, floods the optical memory device 10 with visible light which is focused by a lens 33 in the form of an image onto a viewing screen 34. This image has a pattern corresponding to the pattern of intensity impressed upon this visible light by the ceramic plate 13 in the device 10, as more fully described below. The memory device 10, together with the write-in laser 31, the readout visible light source 32, the power supply 22, the voltage pulse source, the lens 33 and screen 34, all form a complete optical memory and display system suitable for slow scan graphics ("blackboard writing").

As an optional addition to the system shown in FIG. 1, in order to afford fast alternating write-in and readout capabilities, a chopping wheel (not shown) can be located between the device 10 and the optical sources 31 and 32. The chopping wheel is arranged to alternate the incidence of radiation from these sources 31 and 32 onto the device 10. Thereby, the write-in and readout beams can be quickly alternated at a rate determined by the angular speed of the chopping wheel.

Typically, the plate 13 is a coarse grain polycrystalline ceramic composed of 35 percent (by weight) lead zirconate - 65 percent (by weight) lead titanate doped with the impurity lanthanum (7 to 8 atomic percent). Advantageously, the size of the individual grains in this ceramic is at least about 4 micron or more. The overall size of this ceramic plate 13 can be 2.5 cm × 2.5 cm × 175 micron in thickness, for example.

In a typical case, the photoconductive layer 12 is essentially cadmium sulfide, having a thickness of 5 micron. This thickness of the photoconductive layer 12 is selected, in any event, to be sufficient to prevent significant voltage drops from occurring across the ceramic plate 13 in the absence of a write-in beam of radiation from the laser 31 incident on this photoconductor layer 12. Thereby, only in the presence of the write-in beam from the laser 31, incident upon any selected portion of the photoconductive layer 12, will the corresponding portion of the ceramic plate 13 be subjected to significant electric fields produced by the voltage pulses from the source 24. By significant electric fields is meant fields sufficient to modify the optical scattering property of the ceramic plate 13. On the other hand, electrodes 11 and 14 should be sufficiently transparent to allow optical radiation from the visible light source 32 to be transmitted to the lens 33 for focusing on the screen 34 in sufficient quantity to be detected, by the human eye, for example. Typically, these electrodes are essentially made of indium oxide, having a thickness of about 2,000 angstroms, while the visible light source floods the device 10 with a light flux of about 0.1 watts/cm$^2$.

Advantageously, the lens 33 has an F number of at least 5, in order that the light which is scattered by the plate 13 should not cause undesired optical "crosstalk." Alternatively, stops can be used in order to limit the optics (from the device 10 to the screen 34) to an aperture equivalent to this F number of 5, so that the light which is scattered by the ceramic plate 13 is thereby stopped and does not reach the screen 34.

The laser source 31, in a typical case, furnishes a write-in beam having an intensity of about 0.2 watts/cm$^2$ at 4,416 angstroms (He - Cd laser), with a cross section diameter of about 1 or 2 mils focussed on the photoconductive layer 12.

In operation of the system shown in FIG. 1, the ceramic plate 13 is first heated to the "depolarization" temperature, that is, sufficient to depolarize (depole) it to a state in which the orientation of the crystalline grains is random in three directions (FIG. 2.1). This heating is produced by closing the switch 21 to allow electrical current to flow from the power supply 22 to the strip contacts 15 and 16 across the electrode layer 11. Typically, this current is adjusted to dissipate about 2 watts in the device 10, so that the ceramic plate 13 is heated typically within 10 seconds or less, to a temperature of approximately 110° to 120° C. or more, but advantageously well below the Curie temperature (typically 150° C.) for the ceramic material of this plate. At this temperature, the internal electrical polarization orientation of the individual grains will thereby be aligned at random in three dimensions (FIG. 2.1). After the plate 13 has thus been heated, the switch 21 is opened and the plate 13 cools (due to ambient conditions) to a lower temperature at which the internal polarization orientations are permanent (until modified by applied electric fields). Next, the switch 23 is closed and the write-in beam of light from the laser 31 is directed upon a selected portion of the device 10 corresponding to a selected portion of the photoconductive layer 12, and consequently also impinging on the corresponding portion of ceramic plate 13 directly in registry therewith. At the same time as the laser beam is thus directed on this portion of the device 10, the voltage pulse source 24 delivers a sequence of two opposite voltage pulses, typically +175 volts and −80 volts, across the contacts to the electrode layers 11 and 14. Thereby, a maximum electric field of about 10 kilovolts/cm, directed perpendicular to the plane of the plate 13, is produced across this plate (175 microns thick) only at the portion impinged by the write-in laser beam. Thus, only that portion of the plate has its polarization switched, that is, through the intermediate state illustrated in FIG. 2.2 (by reason of the first voltage pulse) into the "final" state illustrated in FIG. 2.3 (by reason of the second pulse). In the intermediate state (FIG. 2.2), substantially all the grains of this portion of the plate 13 are polarized substantially in the direction normal to the plane of the plate (saturation polarization); whereas in the "final" state (FIG. 2.3), substantially all the grains of this portion of the plate 13 are oriented substantially parallel to the plane of the plate, but otherwise at random in the two dimensions of this plane.

This procedure can then be repeated with the laser 31 directed on other selected portions of the device 10; so that the plate 13 is finally in a condition in which some portions (impinged by the laser 31 simultaneously with the two-pulse voltage sequence) are in the "final" state (FIG. 2.3); whereas the other (nonimpinged) portions are still in the thermally "depoled" state (FIG. 2.1). Thus, a desired pattern of localized states ("depoled" vs. "final") is impressed on the plate 13. This pattern can be read out by flooding the device 10 with visible light from the source 32 and focusing the visible optical radiation transmitted through the device 10 onto the screen 34. Since the "final" state (FIG. 2.3) is characterized by significantly lower forward optical transmission (higher scattering) in the visible region of the spectrum than the "depoled" state (FIG. 2.1), those portions of the plate 13 which were subjected to the write-in beam from the laser 31 (simultaneously with the two-pulse voltage sequence) will appear correspondingly darker than those portions of the plate 13 which are still in the depoled state. This condition of the system persists until the plate 13 is "erased" by closing the switch 21, thereby heating the plate everywhere to the "depolarization" temperature. Thereafter, further selected portions can be subjected to the write-in beam from the laser 31 simultaneously with the voltage pulse sequence of two pulses from the source 24, in order to produce a new pattern of information in the plate 13 ("final" vs. "depoled" locations).

The sequence of two opposite voltage pulses from the source 24 is advantageously characterized in that the second pulse has a pulse height of about half as much as the first pulse. However, the second pulse can also have a height in the range of about one-third to two-thirds of the first pulse for most designs. Each of these pulses advantageously has a pulse width of at least 10 microseconds or more for the particular ferroelectric ceramic described, in order to be of sufficient duration to modify the internal electrical polarization of the plate 13 permanently, that is, until "erased" by heating as described above.

While this invention has been described in terms of a specific embodiment, various modifications can be made without departing from the scope of the invention. For example, an additional photoconductive layer can be sandwiched in the device 10 between the electrode layer 14 and the ceramic plate 13. Also, selective erase capability can be obtained by applying only the first of the sequence of two pulses from the voltage source 24 when the switch 23 is closed at a time when the beam from the laser 31 impinges upon a selected portion of the device 10, thereby changing the optical scattering of that portion relative to the written-in portions elsewhere in the device.

It should also be understood that various impurity doped lead zirconate-lead titanate compositions can be used for the ceramic material in the plate 13. For example, such impurities as bismuth, niobium, and lead impurities can also be utilized in lead zirconate-lead titanate coarse grain ferroelectric ceramics in the practice of this invention; and ferroelectric ceramic materials other than lead zirconate-lead titanate may be used as they become available in the art. Additionally, the specific parameters described are merely illustrative of a specific design. Obviously, other designs are feasible.

What is claimed is:

1. An optical display device which comprises:

a. an electrooptic plate whose optical scattering property is sensitive to electric fields; and b. means for applying, to at least a portion of the plate in a thermally depoled state, a sequence of two voltage pulses of opposite polarity, the second pulse having a height less than that of the first pulse, whereby the optical scattering property of the portion of the plate is modified in response to the sequence.

2. A device according to claim 1 in which the plate is a coarse grain ferroelectric ceramic plate and in which the height of the second pulse is about one-third to two-thirds of the height of the first pulse.

3. A device according to claim 2 in which the plate is essentially an impurity doped lead zirconate-lead titanate whose grain size is about 4 microns or more.

4. A device according to claim 1 which further includes means for heating the plate to a temperature sufficient to return the plate to the thermally depoled state.

5. A device according to claim 1 which further includes a photoconductive layer in contact with at least one major surface of the plate, and first and second electrodes located on opposite sides of the plate, said electrodes being at least semitransparent to a readout beam of optical radiation, said means for applying the sequence of voltage pulses being electrically connected to the electrodes.

6. An optical display device which comprises:

a. a coarse grain ferroelectric ceramic plate whose optical scattering property can be modified by applied electric fields;

b. means for thermally depolarizing the plate; and c. means for applying across the plate a sequence of two voltage pulses of opposite polarity which produce electric fields in at least a selected region of the plate in a direction normal to the plane of the plate, in order to produce a state of internal electric polarization of the plate such that the region of the plate is characterized by a substantially saturated polarization normal to the plate immediately subsequent to the first of the pulses and by substantially zero average remanent polarization immediately subsequent to the second of the pulses.

7. A device according to claim 6 in which the plate is essentially lead zirconate-lead titanate doped with an impurity and in which the grain size is at least about 4 microns.

8. A device according to claim 6 in which the sequence is characterized in that the second pulse has a height of between about one-third and two-thirds that of the first pulse.

9. A device according to claim 6 which further includes first and second electrodes located on opposite sides of the plate, said electrodes being at least partially transparent to a readout beam of optical radiation, the means for applying said sequence of voltage pulses being electrically connected to the electrodes.

10. A device according to claim 9 which further includes at least one photoconductive layer located between at least one electrode and at least one major surface of the plate; said photoconductive layer having a thickness sufficient to prevent the voltage pulses from being applied across the plate to the extent of substantially changing the optical scattering property of the plate in the absence of a write-in beam incident on the photoconductive layer, and to allow said pulses to change the property in the presence of the write-in beam.

* * * * *